United States Patent [19]

Montgomery et al.

[11] 3,885,685
[45] May 27, 1975

[54] TRANSPORTABLE LOADER FOR AIRCRAFT

[75] Inventors: Howard W. Montgomery; Charles R. Stanley, both of Bellevue, Wash.

[73] Assignee: The Boeing Company, Seattle, Wash.

[22] Filed: Jan. 17, 1974

[21] Appl. No.: 434,294

[52] U.S. Cl. ............... 214/38 BB; 187/9; 187/95; 214/674; 244/118 R; 244/137 R
[51] Int. Cl. ............................................. B64d 9/00
[58] Field of Search.......... 214/38 B, 38 BA, 38 BB, 214/83.26, 512, 515, 75 R, 672, 674; 244/118 R, 137 R; 187/9, 95

[56] References Cited
UNITED STATES PATENTS

| | | | |
|---|---|---|---|
| 2,910,203 | 10/1959 | Todd | 214/672 |
| 3,153,544 | 10/1964 | Jung et al. | 214/512 X |
| 3,302,810 | 2/1967 | Heidrick | 214/674 X |
| 3,375,947 | 4/1968 | Kissilov | 214/515 X |
| 3,587,784 | 6/1971 | Tait | 187/9 |
| 3,666,127 | 5/1972 | Guyaux | 214/38 BA X |
| 3,704,799 | 12/1972 | Morris | 187/9 |

*Primary Examiner*—Robert G. Sheridan
*Attorney, Agent, or Firm*—Christensen, O'Connor, Garrison & Havelka

[57] ABSTRACT

A transportable loader that is collapsible into a compact configuration suitable for storage and transportation beneath the cargo deck of an aircraft is disclosed. When expanded to its operative configuration, the loader provides an elevator mechanism attached to and counterbalanced by the aircraft. The elevator mechanism is suitable for raising and lowering large loads between ground level and the cargo deck of the aircraft, or any intermediate point therebetween.

9 Claims, 5 Drawing Figures

3,885,685

SHEET 1

TRANSPORTABLE LOADER FOR AIRCRAFT

BACKGROUND OF THE INVENTION

This invention relates to apparatus for loading and unloading aircraft and, more particularly, to apparatus for loading and unloading aircraft that is suitable for transportation by the aircraft.

A wide variety of apparatus for loading and unloading aircraft, particularly cargo aircraft, have been proposed and are in use. Such apparatus varies from complicated elevator systems permanently located at airports to uncomplicated ramps carried by the aircraft. While such prior art apparatus has been found to be somewhat satisfactory in many environments, certain disadvantages still exist. For example, permanently located apparatus is expensive to manufacture and maintain. Thus, in order to be cost effective, such apparatus must be in daily use. Because of this restriction, many airports cannot justify having such apparatus available.

On the other hand, uncomplicated ramps and the like have the disadvantage that they take up valuable space on the cargo deck of the aircraft and, thus, limit the cargo carrying capability of the aircraft. Moreover, ramps are unsuitable for moving heavy, bulky cargo containers unless supplemented by complicated mechanical systems, such as winches, cables, etc., all of which further reduce the cargo carrying capability of the aircraft, in addition to being unsatisfactory. Thus, it is desirable to provide an aircraft loading and unloading mechanism suitable for use by an aircraft, particularly a cargo carrying aircraft, that is transportable by the aircraft without significantly reducing the cargo carrying capability of the aircraft, yet is suitable for loading and unloading relatively heavy and bulky cargo containers.

Therefore, it is an object of this invention to provide a new and improved apparatus for loading and unloading aircraft.

It is a further object of this invention to provide a new and improved apparatus suitable for loading and unloading an aircraft which is transportable by the aircraft.

It is another object of this invention to provide a new and improved apparatus for loading and unloading an aircraft which is transportable by the aircraft in an area not normally used to carry a significant amount of cargo.

It is yet another object of this invention to provide a transportable loading apparatus suitable for loading and unloading heavy, bulky aircraft cargo without unduly restricting the cargo carrying capability of the aircraft.

SUMMARY OF THE INVENTION

In accordance with the principles of this invention, a transportable loader that is collapsible into a compact configuration suitable for storage and transporation beneath the cargo deck of an aircraft is provided. When expanded to its operative configuration, the transportable loader provides an elevator mechanism attached to and counterbalanced by the aircraft that is suitable for raising and lowering large loads between ground level and the cargo deck of the aircraft, or any intermediate point therebetween.

In accordance with further principles of this invention, the transportable loader of the invention is removed from beneath the main cargo deck of the aircraft in a normal manner by any suitable means and moved to a ground level installation position where it is attached to the aircraft's nose wheel mechanism. The transportable loader is also expanded and attached to the structural frame of the aircraft adjacent to the cargo deck. No counterweight is required because the aircraft itself acts to counterbalance loads as they are raised and lowered.

In accordance with still further principles of this invention, the elevator mechanism comprises a roller conveyor platform which is raised and lowered by a ball-screw mechanism. In addition, the elevator mechanism comprises a vertical carriage that is raised and lowered by a second ball-screw mechanism.

It will be appreciated from the foregoing brief summary of the invention that a transportable loader collapsible into a compact configuration that can be stored and easily transported by an aircraft without unduly limiting the cargo carrying capability of the aircraft is provided. When expanded to its operative configuration, the invention provides a unique elevator mechanism suitable for raising and lowering large cargo containers between the cargo deck of the aircraft and a suitable loading and unloading level, such as ground level. The cargo containers are easily conveyed to and from the aircraft and to and from suitable pallets due to the inclusion of platform rollers. Hence, the invention overcomes the prior art disadvantages noted above by providing a transportable loader that is easily carried by an aircraft without unduly limiting the cargo space of the aircraft. Yet, the invention provides a loading mechanism that is suitable for moving large loads without requiring that the loading mechanism be permanently located at an airport.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Prior to describing a preferred embodiment of the invention, it is pointed out that the invention is useful with cargo aircraft having access to the cargo deck through the nose of the aircraft. The invention is particularly suitable for use with aircraft having relatively large nose access openings. For example, aircraft having a nose raisable through an angle of approximately ninety degrees. An example of such an aircraft is the cargo carrying model of the 747 aircraft produced by the Boeing Company of Seattle, Wash. However, it is pointed out that the invention is also suitable for use with other types of aircraft if suitable obvious modifications to the attachment elements are made. In addition, the invention is suitable for use with aircraft that provide access to the cargo deck through other regions of the aircraft, again assuming that suitable obvious modifications are made, as will be understood by those skilled in the art. Hence, the invention should not be construed as to be limited to use with aircraft exactly like the Boeing 747, even though the invention is described in conjunction with a Boeing 747 aircraft.

Figure 1:
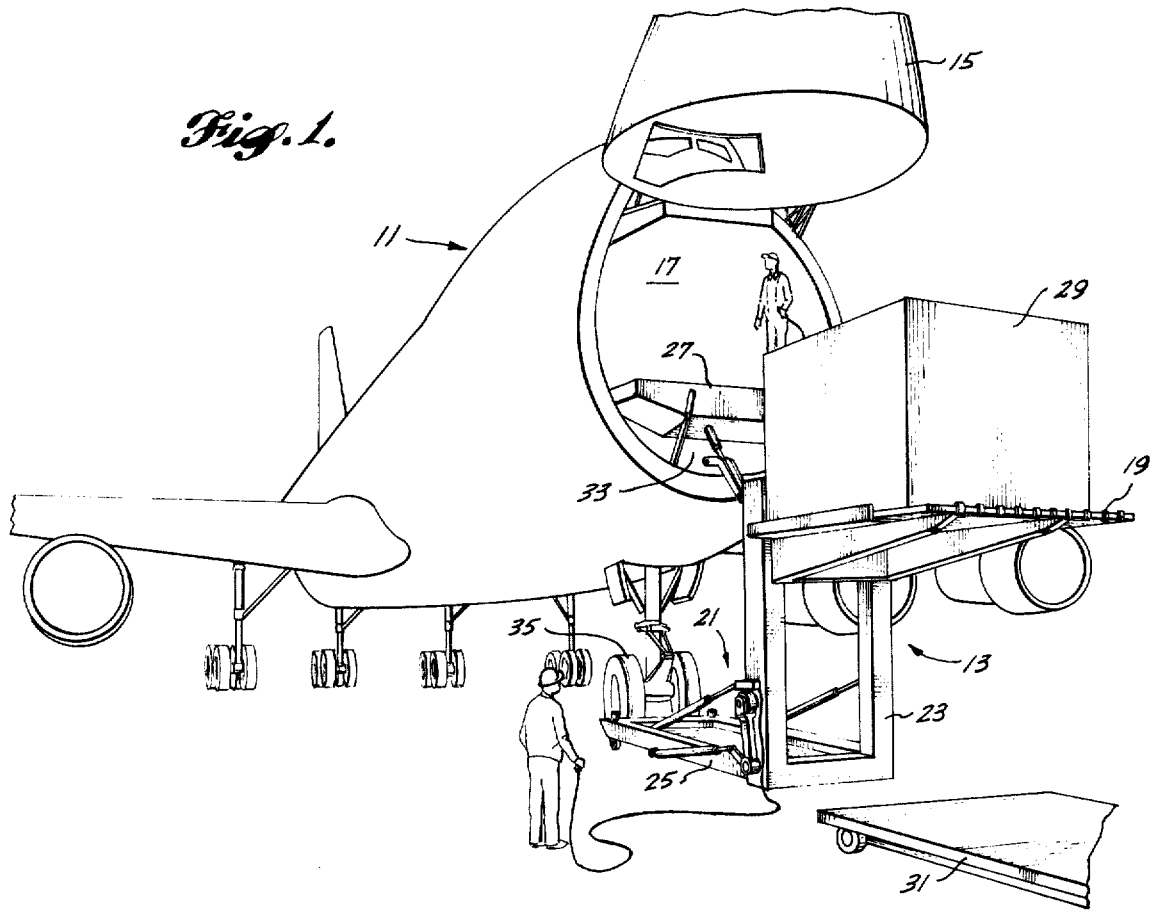
FIG. 1 is a pictorial diagram illustrating a preferred embodiment of the invention attached to an aircraft.

FIG. 1 is a pictorial diagram illustrating a cargo carrying aircraft 11, such as the Boeing 747, and a transportable loader 13 formed in accordance with the invention. The transportable loader 13 is illustrated in operative (expanded) configuration, and the aircraft 11 is illustrated as having a raised nose 15 allowing access to its cargo compartment 17.

As illustrated in FIG. 1, the transportable loader, in its operative configuration, generally comprises a platform 19 and a support structure 21. The support structure 21 comprises a vertical support member 23 and a horizontal support member 25. The vertical and horizontal support members are positioned at right angles to one another, and the platform 19 is raised and lowered along the vertical support member 23 between the level of the cargo deck 27 of the aircraft and ground level, or any intermediate point therebetween. Cargo containers 29 are moved between the platform 19 and the cargo deck 27. The cargo is then moved between the level of the cargo deck 27 and the level of a suitable cargo pallet 31 located at ground level, or thereabouts. Alternatively, a truck could replace the pallet 31 and the cargo could be lowered to the level of the truck deck. Cargo is raised to the level of the cargo deck in the reverse manner.

As will be better understood from the following description, the transportable loader 13 is stored in a collapsed configuration in a storage region 33 located beneath the cargo deck 27. The loader is removed from the storage region 33 by any suitable means, such as a conventional lower lobe loader, highlift, fork-lift truck or a ramp, for examples. After the loader is brought to ground level, it is positioned so that the horizontal support member 25 can be attached to the nose wheel structure 35 of the aircraft 11. In addition, the vertical support member 23 is rotated to a vertical position and attached by a suitable attachment mechanism to the structural frame of the aircraft. Further, the platform 19 is rotated into its operative (horizontal) position. Thereafter, the wheels which allow the apparatus of the invention to be moved to its operative position with respect to the aircraft are raised and the loader is ready to raise and lower cargo, as desired.

Figure 2:
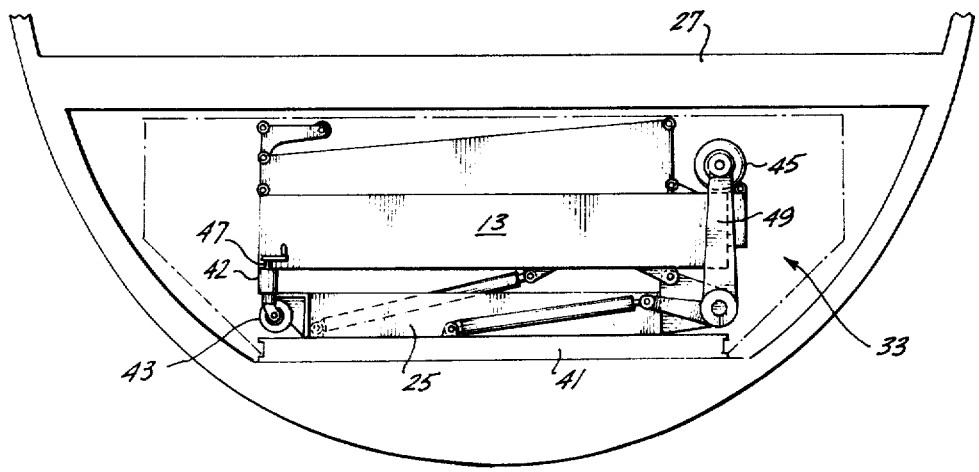
FIG. 2 is a cross-sectional view illustrating a preferred embodiment of the invention, in collapsed form, stored beneath the cargo deck of an aircraft of the type illustrated in FIG. 1.

FIG. 2 is a cross-sectional diagram illustrating the transportable loader 13 in its collapsed configuration stowed in the region 33 located beneath the cargo deck 27. When collapsed, the transportable loader 13 is "folded" into a relatively compact configuration. The collapsed loader is supported by a loader pallet 41. Both the loader and the pallet 41 are stowed in the region 33 located beneath the cargo deck 27.

The loader pallet 41 and the transportable loader 13 are moved from the region 33 to ground level by any suitable means, such as a conventional lower lobe loader, high-lift, fork-lift truck, a ramp, etc.

Figure 3:
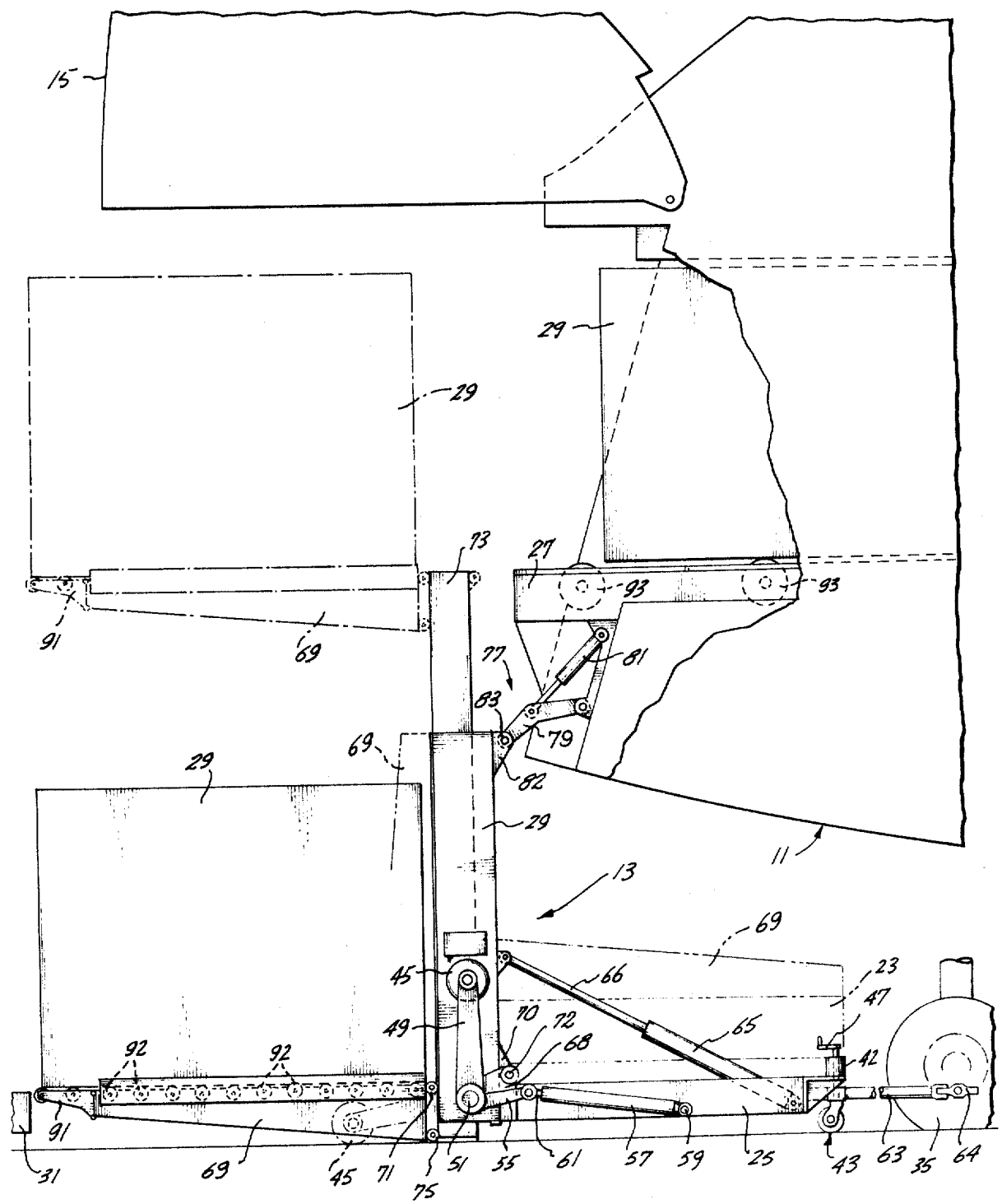
FIG. 3 is a side view illustrating a preferred embodiment of the invention in its operative configuration and attached to an aircraft of the type illustrated in FIG. 1.

As illustrated in FIG. 3, after being moved to ground level, the transportable loader 13 is moved off of the loader pallet 41 by lowering front and rear sets of wheels 43 and 45, or by any other suitable method. The rear set of wheels 43 are caster-type wheels attached to the lower end of a threaded shaft which coacts with a suitably internally threaded cylindrical housing 42 affixed to the horizontal support member 25. In a conventional manner when a handle 47 affixed to the upper end of the threaded shaft is rotated the wheels are raised or lowered, depending upon the direction of handle rotation.

The front set of wheels 45 are mounted on one end of lever arm 49. The other ends of the lever arms 49 are rotatably attached via a suitable attachment mechanism 51 to the vertical support frame 23, on either side thereof. Fixedly attached to the lever arms 49, at generally right angles thereto, are control arms 55. The remote end of the control arms 55 are attached via a suitable hydraulic or pneumatic cylinder 57 to the horizontal support member 25 at an attachment point 59 located intermediate the ends of the horizontal support member. As will be understood by those skilled in the art, when the hydraulic or pneumatic cylinder 59 is activated, its associated shaft 61 moves outwardly and rotates the control and lever arms to bring the wheels 45 in contact with the ground as illustrated by the phantom lines in FIG. 3. On the other hand, when the hydraulic or pneumatic cylinder is brought to a collapsed state, the control and lever arms are positioned such that the wheels lie alongside of the vertical support member 23. After the wheels have been lowered to ground level by the mechanism just described, the transportable loader 13, still collapsed, is removed from the pallet and rolled to a position in front of the nose wheel structure 35 of the aircraft 11. Alternatively, the transportable loader may be removed from the pallet prior to lowering the front and rear wheels. Further, the transportable loader may be full or partially expanded in the manner hereinafter described before or after being removed from the loader pallet 41 and prior to being positioned in front of the nose wheel structure 35, as desired.

After being positioned in front of the nose nose wheel structure, or before, as desired, a pair of attachment shafts 63, one located on either side of the front wheels 35, are extended from the horizontal support member 25 by any suitable mechanical, pneumatic or hydraulic mechanism. The outer ends of the attachment shafts 63 are attached to the towing eyes 64 associated with the nose wheel structure 35 by any suitable attachment means, such as bolts, pins, etc., for examples.

After attachment of the attachment shafts 63 to the towing eyes 64, or before attachment thereof, depending upon whether or not raising the transportable loader to its expanded configuration will impinge on the nose of the aircraft if the attachment shafts are attached prior to such expansion, the vertical support member 23 is raised by suitable pneumatic or hydraulic cylinders 65 (one on either side) having one end of their cylindrical housings attached to the horizontal support member 25 and the remote end of their shafts 66 attached by a suitable attachment means, such as bolts, for example, to the vertical support member 23. When the pneumatic or hydraulic cylinders 65 are activated (energized), their shafts 66 raise the vertical support member 23 to a vertical position where it lies at essentially a right angle with respect to the horizontal support member 25. Such raising is performed in a rotary manner. That is, the vertical support member 23 is "pinned" to the horizontal support member via vertical flanges 68, horizontal flanges 70 and pins 72 attaching the flanges together. One pair of vertical and horizontal flanges are located on one side of the loader and a second pair are located on the other side of the loader. The vertical flanges are located at the lower end of the vertical support member and the horizontal flanges are located on the left end of the horizontal support member, as viewed in FIG. 3.

After the vertical support member has been raised, or prior thereto, as desired, platform 69 is rotated from an essentially horizontal position. The platform 69 is rotatably attached at its upper right corners, as viewed in FIG. 3 to a vertical carriage 73 by pins 71. The vertical carriage 73 is located inside of, and movable up and down with respect to the vertical support member 23, as hereinafter described.

After rotation to its horizontal position, the lower right corners of the platform 69 (also as viewed in FIG. 3) are pinned to the vertical carriage by attachment pins 75. The attachment pins are, thus, arrayed beneath the rotation pins and maintain the platform 69 in its horizontal position after it has been rotated to that position.

The upper end of the vertical support member 23 is attached to attachment mechanism 77 (one located on either side of the vertical support member) via a flange 82 and a pin 83. More specifically, the attachment mechanism comprises an angled arm 79 operated by a hydraulic or pneumatic cylinder 81. One end of the angled arm and one end of the housing of the hydraulic or pneumatic cylinder are attached to the bulkhead of the aircraft at spaced points. The remote end of the shaft of the hydraulic or pneumatic cylinder is attached to the midpoint of the angled arm 79. When the hydraulic or pneumatic cylinder 81 is energized its shaft rotates the angled arm 79 from a normally stowed position inside the nose of the aircraft 11 to a position where the other end of the angled arm can be attached by the pin 83 to the flange 82 affixed to the upper end of the vertical support member 23.

After being expanded in the manner just described, the front and rear wheels 45 and 43 are raised so that they are no longer touching the ground. The front wheels 45 may be rotated entirely back to their stowed positions, if desired. The transportable loader is now in its operative configuration.

When expanded to its operative configuration, the transportable loader basically forms an elevator mechanism which moves the elevator platform 69 between a position where it is essentially coplanar with the cargo deck 27 of the aircraft and a ground position (or any point therebetween). Thus, cargo can be moved via the platform between these positions.

Preferably, the elevator platform 69 includes a tip 91 that is rotatable outwardly with respect to the elevator platform 69 to provide a slight extension in length. The tip is rotatably pinned at its upper right corners (as viewed in FIG. 3) to the main portion of the elevator platform and is affixed in its horizontal operating position by attachment pins located at its lower right corners. Moreover, preferably, the elevator platform 69 supports an array of conveyor wheels 92. The conveyor wheels form a row/column array situated such that cargo containers are easily rolled onto and off of the platform. Also, preferably, the platform includes relatively narrow side rails 94 that are adapted to prevent cargo from sliding off of the sides of the platform, i.e., the rails direct cargo toward the center of the platform. In addition, preferably, the aircraft loading deck 27 includes a plurality of rotatable wheels 93 which allow large cargo containers 29 to be easily rolled from the interior of the aircraft to a point where they can be rolled onto the elevator platform 69, or vice versa. It should be noted, however, by those skilled in the art and others, that other types of both aircraft and elevator platform conveyor mechanisms can be used, as desired.

Basically, the mechanism for moving the elevator platform comprises two sections. One section is directed to moving the elevator platform 69 up and down with respect to the vertical carriage 73. The second section is directed to moving the vertical carriage 73 up and down with respect to the vertical support member 23, as will be better understood from the following description.

Figure 4:
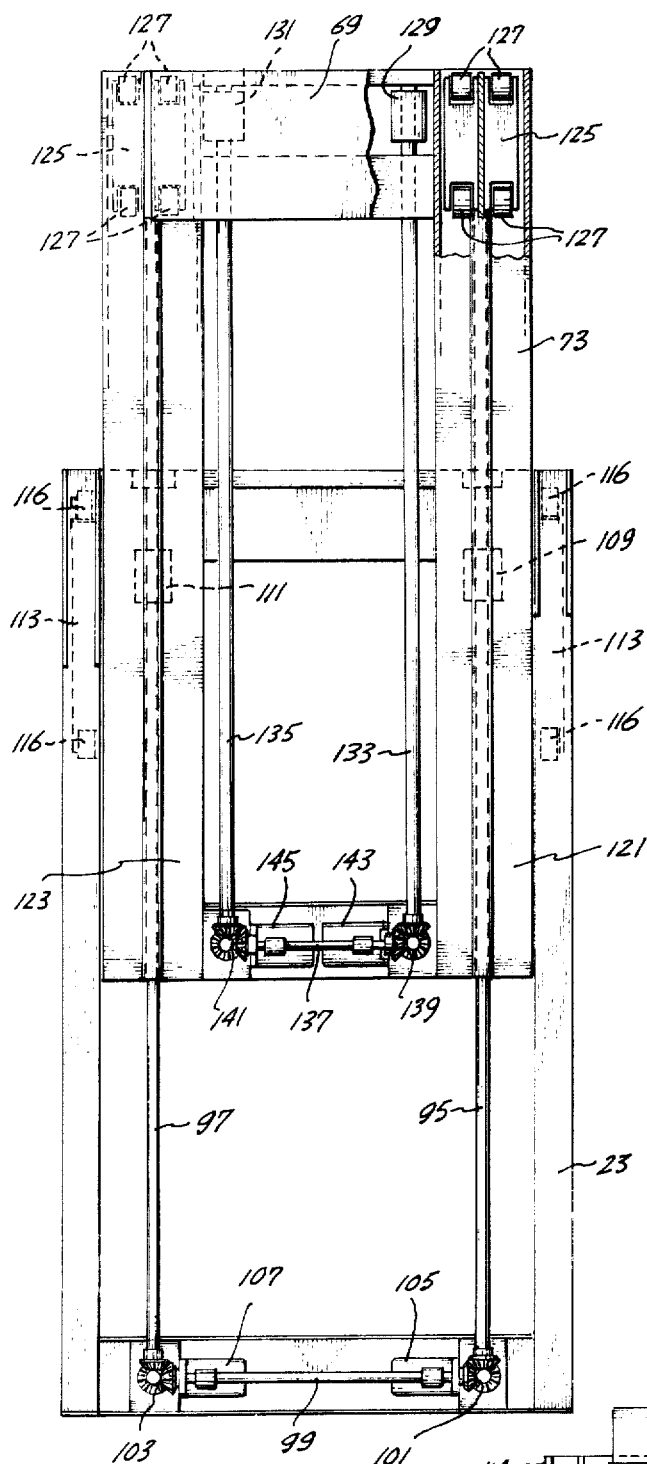
FIG. 4 is a front view of an elevator mechanism forming a part of the preferred embodiment of the invention; and, FIG. 5 is a cross-sectional top view of the elevator mechanism illustrated in FIG. 4.

Turning now to a description of the overall mechanism for moving the elevator platform up and down, FIG. 4 illustrates the vertical support frame 23 and the vertical carriage 73. Also illustrated in FIG. 4 is the inner end of the elevator platform 69.

The mechanism for vertically moving the vertical carriage 73 with respect to the vertical support member 23 comprises a pair of spaced vertical shafts 95 and 97. The vertical shafts are rotatably affixed to the vertical support member 23, one on either side. While the vertical shafts are free to rotate about vertical axes, they are prevented from moving vertically. A cross shaft 99 located at the bottom of the vertical support member 23 is mechanically coupled, on either end, to the vertical shafts by suitable bevel gear arrangements 101 and 103. Additional bevel and other suitable gears couple each bevel gear arrangement to the shafts of one of right and left motors 105 and 107.

The vertical shafts 95 and 97 are threaded (one right-hand and the other left-hand) and coact with nut 109 and 111 affixed to the vertical carriage 73. That is, the threaded shafts pass through the nuts in a manner such that when the shafts are rotated in one direction or the other a force is applied to the nuts tending to raise or lower the nuts, depending upon the direction of rotation. Since the nuts are affixed to the carriage, this action raises or lowers the vertical carriage.

The right and left motors 105 and 107, one of which forms an up motor and the other of which forms a down motor, control the direction of rotation of the vertical shafts 95 and 97. That is, one of these motors rotates the vertical shafts in one direction and the other rotates the vertical shafts in the other direction. Thus, when one of these motors is energized, it causes the carriage to move up and when the other motor is energized it causes the carriage to move down.

Figure 5:
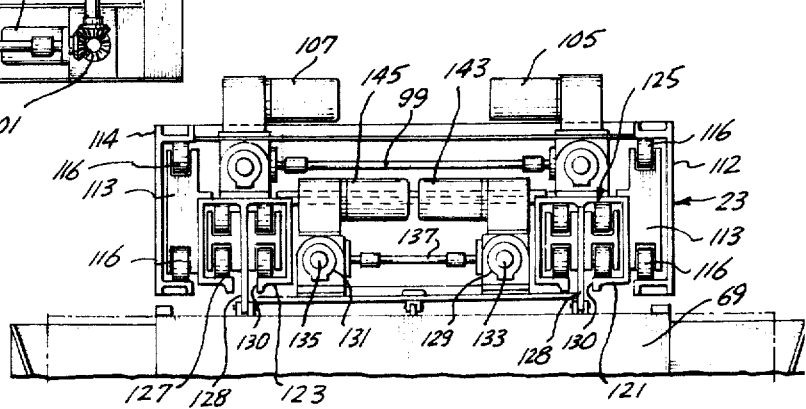

As best illustrated in FIG. 5, the sides of the vertical support member 23 are channels 112 and 114. The channels face one another. Roller sets 113 are attached to either side of the vertical carriage and include rollers 116 that ride on the sides of the channels 112 and 114 forming part of the vertical support member 23. The roller sets 113 maintain the vertical carriage vertical;

yet the roller sets allow the carriage to be moved up and down in the manner previously described.

In a generally similar manner, the elevator platform 69 is moved up and down with respect to the vertical carriage 73. More specifically, the vertical carriage includes two generally box channels 121 and 123 that are vertically arrayed. Held in the box channels are roller sets 125, one set being associated with each channel. The roller sets 125 include rollers 127 which ride on sides of the box channels. The platform 69 is attached by flanges 128 to the roller sets 125. The flanges pass through slots 130 formed in the "front" of the box channels. Thus, as the platofrm is moved up and down in the manner hereinafter described, the roller sets maintain the platform in a horizontal position without impinging on its up and down movement.

Attached to the rear of the elevator platform 69 are nuts 129 and 131. Two vertical threaded shafts 133 and 135 pass through the nuts 129 and 131. The vertical shafts 133 and 135 are attached to the vertical carriage in a manner such that they are free to rotate, but are prevented from moving vertically. The vertical shafts are cross-coupled by a coupling shaft 137 located at the bottom of the vertical carriage and connected to each of the vertical shafts via a bevel gear arrangement 139 and 141. One bevel gear arrangement is connected by a further bevel gear, and other gears, as necessary to the shaft of an up motor 143 and the other bevel gear arrangement is connected in a similar manner to the shaft and of a down motor 145. One of the vertical shafts, and its associated nut, is threaded in a right-hand manner and the other shaft and nut is threaded in a left-hand manner.

In operation, when the shafts of the up and down motors rotate, through the bevel gear arrangements, the vertical shafts 133 and 135 rotate in one direction or the other direction, depending upon which of the motors is energized. The vertical shaft rotation causes the shaft threads to coact with the nuts 129 and 131 and move the elevator platform 69 up or down, as the case may be. Thus, both the elevator platform and the vertical carriage are movable up and down.

It will be appreciated from the foregoing description that the invention provides a transportable loader that can be folded into a relatively compact configuration, suitable for storage in a relatively small place, such as beneath the cargo deck of an aircraft. The transportable loader is expandable to a configuration where it is suitable for raising loads from relatively low levels, such as ground level, to relatively high levels, such as the cargo deck of an aircraft, or to any level therebetween, such as a truck trailer platform level. The invention is suitable for moving relatively large loads, as well as medium and small loads, as desired. The loads may be separable or relatively large cargo containers. Ballast for the transportable loader is provided by the aircraft itself alone. Thus, no external ballast or bracing is required.

While a preferred embodiment of the invention has been illustrated and described, it will be appreciated to those skilled in the art and others that various changes can be made therein without departing from the spirit and scope of the invention. For example, while pneumatic or hydraulic cylinders have been illustrated to control the collapsing and expanding of the transportable loader, mechanical systems can also be used, if desired. Moreover, either hydraulic or electric motors can be utilized to control the raising and lowering of the platform and the vertical carriage, as desired. Further, remote control systems operable from the cargo deck of the aircraft, or ground level can be utilized, as desired, to control the raising and lowering of the platform and the vertical carriage. Hence, the invention can be practiced otherwise than as specifically described herein.

The embodiments of the invention in which an exclusive property or privilege is claimed are defined as follows:

1. A collapsible transportable loader for raising and lowering cargo between the cargo deck of a nose-loading cargo aircraft having a nose wheel structure located rearwardly of a nose access opening allowing access to the cargo deck of the aircraft and some other predetermined level, said collapsible transportable loader comprising:

a horizontal support member;

first attachment means located at one end of said horizontal support member and suitable for attaching said horizontal support member to the nose wheel structure of a nose-loading cargo aircraft;

a vertical support member rotatably attached to the end of said horizontal support member opposite to the end associated with said first attachment means;

second attachment means for attaching the upper end of said vertical support member to the bulkhead of said nose-loading cargo aircraft in the region generally defined by the nose access opening;

collapsing means associated with said horizontal and vertical support members for rotating said horizontal and vertical support members with respect to one another between a position whereat said vertical support member lies in a plane parallel to said horizontal support member and a position whereat said vertical support member lies at a right angle with respect to said horizontal support member;

an elevator platform suitable for supporting cargo;

elevator means associated with said vertical support member and said elevator platform for raising and lowering said elevator platform between the level of said cargo deck of said nose-loading cargo aircraft and some other level; and, third attachment means for rotatably attaching said elevator platform to said elevator means on the side of said vertical support member opposite to said horizontal support member and in a manner such that said elevator platform is rotatable between a position whereat said elevator platform lies in a plane parallel to said vertical support member and a position whereat said elevator platform lies at a right angle with respect to said vertical support member.

2. A collapsible transportable loader as claimed in claim 1, wherein said elevator means comprises:

a vertical carriage;

a first elevator mechanism attached to said vertical support member and to said vertical carriage for raising and lowering said vertical carriage with respect to said vertical support member; and, a second elevator mechanism attached to said elevator platform and to said vertical carriage for raising and lowering said elevator platform with respect to said vertical carriage.

3. A collapsible transportable loader as claimed in claim 2, wherein said third attachment means comprises a hinge for attaching a corner of said elevator platform to said vertical carriage in a rotatable manner and an attachment mechanism located beneath said hinge for attaching said elevator platform to said vertical carriage so as to maintain said elevator platform in a horizontal plane.

4. A collapsible transportable loader as claimed in claim 3, including wheel means attached to said collapsible transportable loader to allow said collapsible transportable loader to be easily manually moved between predetermined positions.

5. A collapsible transportable loader as claimed in claim 4, wherein said wheel means comprises:
   a first pair of raisable and lowerable wheel means attached to the end of said horizontal support member remote from the end about which said vertical and horizontal support members rotate; and,
   a second pair of raisable and lowerable wheel means attached to the lower end of said vertical support member, said second pair of raisable and lowerable wheel means including a pair of wheels and lowering and raising means for rotating said pair of wheels with respect to said vertical support members between two positions, one of said positions being a position wherein said pair of wheels allow said loader to be easily maneuvered and the other of said positions being a position wherein said pair of wheels do not allow said loader to be easily maneuvered.

6. A collapsible transportable loader as claimed in claim 5, including conveyor means located on the upper surface of said elevator platform and further including guiding means for guiding said cargo toward the center of said elevator platform.

7. A collapsible transportable loader as claimed in claim 6, wherein said conveyor means comprises an array of roller elements and wherein said guiding means comprises rails located along two opposing sides of said platform.

8. A collapsible transportable loader as claimed in claim 1, including wheel means attached to said collapsible transportable loader to allow said collapsible transportable loader to be easily manually moved between predetermined positions.

9. A collapsible transportable loader as claimed in claim 8, wherein said wheel means comprises:
   a first pair of raisable and lowerable wheel means attached to the end of said horizontal support member remote from the end about which said vertical and horizontal support members rotate; and,
   a second pair of raisable and lowerable wheel means attached to the lower end of said vertical support member, said second pair of raisable and lowerable wheel means including a pair of wheels and lowering and raising means for rotating said pair of wheels with respect to said vertical support members between two positions, one of said positions being a position wherein said pair of wheels allow said loader to be easily maneuvered and the other of said positions being a position wherein said pair of wheels do not allow said loader to be easily maneuvered.

* * * * *